United States Patent
Ruiz et al.

(10) Patent No.: US 10,752,823 B1
(45) Date of Patent: Aug. 25, 2020

(54) WELLBORE SERVICING COMPOSITION WITH CONTROLLED GELATION OF CEMENT KILN DUST AND METHODS OF MAKING AND USING SAME

(71) Applicant: Halliburton Energy Services, Inc., Houston, TX (US)

(72) Inventors: Stephanie Ruiz, Spring, TX (US); Thomas Jason Pisklak, Cypress, TX (US); Aleksey Kolasnikov, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/563,479

(22) Filed: Sep. 6, 2019

(51) Int. Cl.
*E21B 33/13* (2006.01)
*C09K 8/40* (2006.01)
*C09K 8/42* (2006.01)
*C09K 8/46* (2006.01)

(52) U.S. Cl.
CPC ............... *C09K 8/40* (2013.01); *C09K 8/424* (2013.01); *C09K 8/46* (2013.01); *E21B 33/13* (2013.01)

(58) Field of Classification Search
CPC .. C09K 8/40; C09K 8/424; C09K 8/46; E21B 33/13
See application file for complete search history.

(56) References Cited

U.S. PATENT DOCUMENTS

| | | | |
|---|---|---|---|
| 7,077,203 B1 | 7/2006 | Roddy et al. | |
| 7,199,086 B1 | 4/2007 | Roddy et al. | |
| 7,478,675 B2 | 1/2009 | Roddy et al. | |
| 7,674,332 B2 | 3/2010 | Roddy et al. | |
| 8,505,629 B2 | 8/2013 | Benkley et al. | |
| 8,505,630 B2 | 8/2013 | Chatterji et al. | |
| 8,522,873 B2 | 9/2013 | Benkley et al. | |
| 8,544,543 B2 | 10/2013 | Chatterji et al. | |
| 8,551,923 B1 | 10/2013 | Benkley et al. | |
| 8,691,737 B2 | 4/2014 | Chatterji et al. | |
| 8,921,284 B2 | 12/2014 | Benkley et al. | |
| 9,505,972 B2 * | 11/2016 | Iverson | C04B 28/18 |
| 9,828,541 B2 * | 11/2017 | Agapiou | C04B 28/18 |
| 9,903,184 B2 | 2/2018 | Chatterji et al. | |

(Continued)

FOREIGN PATENT DOCUMENTS

| | | |
|---|---|---|
| WO | 2013089967 A1 | 6/2013 |
| WO | 2018071021 A1 | 4/2018 |

OTHER PUBLICATIONS

Foreign Communication from Foreign Application—International Search Report and Written Opinion of the International Searching Authority, International Application No. PCT/US2019/050374, dated Jun. 4, 2020, 15 pages.

*Primary Examiner* — Silvana C Runyan
(74) *Attorney, Agent, or Firm* — Conley Rose, P.C.; Rodney B. Carroll

(57) ABSTRACT

Provided here are a wellbore servicing composition, methods of making same, and methods of servicing a wellbore penetrating a subterranean formation using same. The wellbore servicing composition comprises cement kiln dust (CKD), an organic acid, and water. A method of servicing a wellbore penetrating a subterranean formation comprises placing the wellbore servicing composition into the wellbore. The wellbore servicing composition can be used as a spacer fluid in a wellbore servicing operation.

20 Claims, 3 Drawing Sheets

(56) References Cited

U.S. PATENT DOCUMENTS

| | | |
|---|---|---|
| 2008/0156491 A1 | 7/2008 | Roddy et al. |
| 2009/0266543 A1 | 10/2009 | Reddy et al. |
| 2013/0213643 A1 | 8/2013 | Chatterji et al. |
| 2014/0202698 A1* | 7/2014 | Pisklak .................. C04B 28/18 166/293 |
| 2015/0107838 A1 | 4/2015 | Chatterji et al. |
| 2018/0334880 A1 | 11/2018 | Jones et al. |

* cited by examiner

U.S. 10,752,823 B1

WELLBORE SERVICING COMPOSITION WITH CONTROLLED GELATION OF CEMENT KILN DUST AND METHODS OF MAKING AND USING SAME

BACKGROUND

This disclosure relates to servicing a wellbore. More specifically, it relates to servicing a wellbore with fluids comprising cement kiln dust (CKD), an organic acid, and water.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, a train of fluids, including a spacer or an efficiency fluid, can be placed though the interior of the pipe and upward into the annulus to displace a portion of the existing fluid in the annulus, in order to separate the drilling fluid from the cementing fluid and prepare the wellbore to receive the cementing fluid. After that, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Cement kiln dust, or CKD, is a material that can be included in wellbore servicing fluids such as spacer fluids or cementitious fluids. For example, CKD can be used to increase the strength development of Portland cements or as a pozzolanic type material in cementitious compositions. Although the use of CKD is fairly common, there are some inherent challenges associated with CKD such as source to source variability in composition and performance properties. Of the variations possible with different CKDs, one potential issue relates to their differing gelation behaviors. For example, a CKD from one source may not gel at all when mixed with water, while another may gel strongly. Therefore, there exists a need to address mitigation of this variable CKD gelation during wellbore servicing operations such as cementing to increase service quality, improve flowability (pumpability) of fluids comprising CKD, mitigate risks of premature end of job due to gelation-associated problems, and to address other issues related to CKD gelation.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
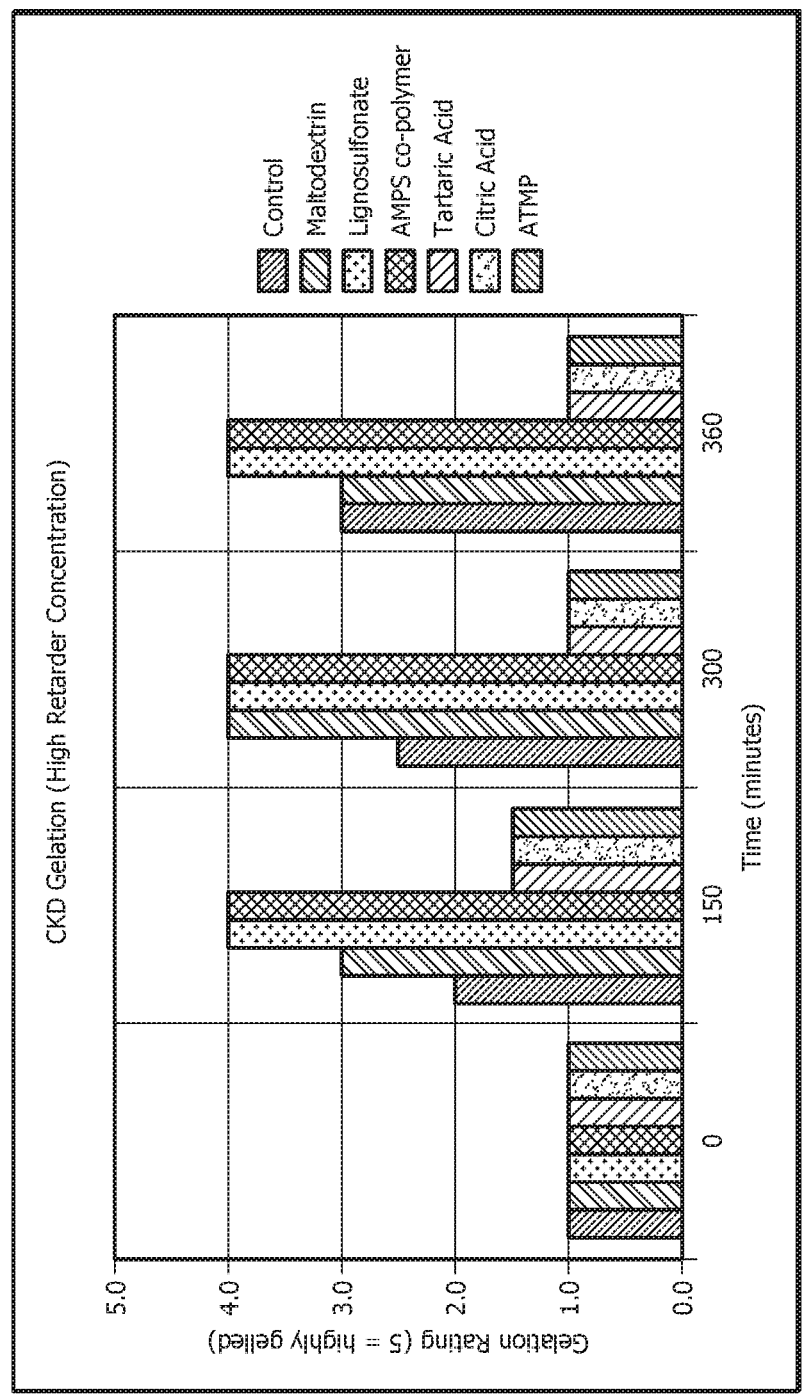
FIG. 1 shows the comparison of Lafarge CKD gelation with high retarder concentrations.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing fluids (also referred to as wellbore servicing compositions or wellbore compositions) comprising cement kiln dust (CKD), an organic acid, and water, and referred to collectively herein as CKD fluids. In some embodiments, the CKD fluids can further comprise one or more cementitious materials as well as other additives. The CKD fluids of the type described herein can be placed in a wellbore as part of a wellbore servicing operation, including without limitation drilling and/or cementing operations. Examples of the CKD fluids include, but are not limited to, spacer fluids, efficiency fluid, cementing fluid, etc. In some embodiments, one or more CKD fluids of the type disclosed herein are used in a wellbore cementing operation, for example as a spacer fluid, as a component in a cementitious composition, or both.

The CKD fluid comprises cement kiln dust (CKD). CKD is a fine powdery material similar in appearance to Portland cement. There are two types of cement kiln processes: wet-process kilns, which accept feed materials in a slurry form; and dry-process kilns, which accept feed materials in a dry, ground form. In each type of process the dust can be collected and processed in two ways: (1) a portion of the dust can be separated and returned to the kiln from the dust collection system (e.g., cyclone) closest to the kiln, or (2) the total quantity of dust produced can be recycled or discarded. The chemical and physical characteristics of CKD that is collected for use outside of the cement production facility will depend in great part on the method of dust collection employed at the facility.

In embodiments, the CKD contains analytical CaO in an average amount of about 65 wt. % by weight of the CKD, in an amount of from about 30 wt. % to about 90 wt. % by weight of the CKD, alternatively from about 50 wt. % to about 80 wt. %, alternatively from about 60 wt. % to about 70 wt. %; analytical $SiO_2$ in an average amount of about 18 wt. % by weight of the CKD, in an amount of from about 0 wt. % to about 30 wt. % by weight of the CKD, alternatively from about 5 wt. % to about 27 wt. %, alternatively from about 10 wt. % to about 25 wt. %; analytical $Al_2O_3$ in an average amount of about 3 wt. % by weight of the CKD, in an amount of from about 0 wt. % to about 12 wt. % by weight of the CKD, alternatively from about 0 wt. % to about 10 wt. %, alternatively from about 0 wt. % to about 6 wt. %. In embodiments, the CKD has a specific gravity (SG) of from about 2.6 to about 3.2. In embodiments, the average SG is about 2.8. In some embodiments, the CKD has a bulk density (BD) of from about 33 lb/ft$^3$ to about 84 lb/ft$^3$. In embodiments, the average BD is about 50 lb/ft$^3$. In some embodiments, the CKD has a water requirement (WR) of from about 21 wt. % to about 100 wt. %. WR refers to an amount of mixing water, based on the weight of the dry CKD, that is needed to form a specified CKD fluid (e.g., a pumpable slurry having a target density and/or rheology). In embodiments, the average WR is about 65 wt. % based on the weight of the dry CKD.

In some embodiments, the CKD is present in the CKD fluid, for example a spacer fluid, in an amount of from about 0.001 wt. % to about 99 wt. % based on the total solid weight of the CKD fluid, alternatively from about 0.01 wt. % to about 60 wt. %, alternatively from about 0.04 wt. % to about 40 wt. % based on the total solid weight of the CKD fluid.

In some embodiments, the CKD is present in the CKD fluid, for example a cementitious composition, in an amount of from about 0.001 wt. % to about 75 wt. % based on the total solid weight of the CKD fluid, alternatively from about 0.01 wt. % to about 50 wt. %, alternatively from about 0.04 wt. % to about 25 wt. % based on the total solid weight of the CKD fluid.

The CKD fluid comprises one or more organic acids that may function as a gelation retarder or inhibitor. The organic acids as disclosed herein can be carboxylic acid, sulfonic acid, or any other organic compound with acidic properties. The organic acid can comprise tartaric acid, citric acid, oxalic acid, gluconic acid, oleic acid, uric acid, maleic acid, fumaric acid, acetic acid, octenyl succinic acid, dodecenyl succinic acid, aminotrismethylenephosphonic acid (ATMP), lactic acid, formic acid, oxalic acid, glyoxylic acid, glycolic acid, uric acid, amino acid, propionic acid, butyric acid, phthalic acid, malonic acid, oxaloacetic acid, benzoic acid, glucuronic acids, acrylic acid, malonic acid, tartronic acid, mesoxalic acid, dihydroxymalonic acid, pyruvic acid, hydracrylic acid, glyceric acid, glycidic acid, isobutyric acid, acetoacetic acid, malic acid, crotonic acid, valeric acid, iso-valeric acid, glutaric acid, oxoglutaric acid, caproic acid, adipic acid, pyrocitric acid, isocitric acid, sorbic acid, enanthic acid, pimelic acid, salicylic acid, cinnamic acid, caprylic acid, phthalic acid, pelargonic acid, trimesic acid, carpric acid, sebacic acid, or combinations thereof. In some embodiments, the organic acid is tartaric acid, citric acid, oxalic acid, gluconic acid, oleic acid, uric acid, maleic acid, fumaric acid, acetic acid, octenyl succinic acid, dodecenyl succinic acid, aminotrismethylenephosphonic acid (ATMP), or a combination thereof.

In some embodiments, the organic acid as disclosed herein may be used at bottomhole circulating temperatures (BHCTs) in the range of from about 50° F. to about 500° F.; alternatively from about 100° F. to about 350° F.; alternatively from about 140° F. to about 220° F.

In some embodiments, the organic acid as disclosed herein is present in the CKD fluid, for example a spacer fluid, in an amount of from about 0.01 wt. % to about 10 wt. % based on the total solid weight of the CKD fluid, alternatively from about 0.1 wt. % to about 6 wt. %, alternatively from about 0.25 wt. % to about 3 wt. % based on the total solid weight of the CKD fluid. In some embodiments, the ratio of the weight of the organic acid to CKD in the CKD fluid, for example a spacer fluid, is in a range of from about 1% to about 4%.

In some embodiments, the organic acid as disclosed herein is present in the CKD fluid, for example a cementitious composition, in an amount of from about 0.01 wt. % to about 7.5 wt. % based on the total solid weight of the CKD fluid, alternatively from about 0.1 wt. % to about 5 wt. %, alternatively from about 0.25 wt. % to about 3 wt. % based on the total solid weight of the CKD fluid. In some embodiments, the ratio of the weight of the organic acid to CKD in the CKD fluid, for example a cementitious composition, is in a range of from about 0.5% to about 4%.

The CKD fluid comprises water. In some embodiments, the water as disclosed herein can be selected from the group consisting of freshwater, seawater, saltwater, or brines (e.g., natural brines, formulated brines, etc.), and any combination thereof. The formulated brines may be produced by dissolving one or more soluble salts in water, a natural brine, or seawater. Representative soluble salts include the chloride, bromide, acetate, and formate salts of potassium, sodium, calcium, magnesium, and zinc. Generally, the water may be from any source, provided that it does not contain an amount of components that may undesirably affect the other components in the CKD fluid. The water may be present in the CKD fluid in an amount to form a pumpable fluid or slurry capable of being placed (e.g., pumped) into the wellbore. The water may be present in the CKD fluid in an amount effective to provide a pumpable fluid or slurry having desired (e.g., job or service specific) rheological properties such as density, viscosity, gel strength, yield point, etc. In some embodiments, the weight ratio of the water to the solid compositions in the CKD fluid, for example a spacer fluid or a cementitious fluid, can be in a range from about 0.5:1 to about 7:1.

In some embodiments, the CKD fluid further comprises a cementitious material, also referred to herein as a cementitious CKD fluid or a CKD cement composition. In some embodiments, the cementitious material as disclosed herein comprises calcium, aluminum, silicon, oxygen, iron, and/or sulfur. In some embodiments, the cementitious material as disclosed herein comprises Portland cement, pozzolana cement, gypsum cement, shale cement, acid/base cement, phosphate cement, high alumina content cement, slag cement, silica cement, high alkalinity cement, magnesia cement, or combinations thereof. In embodiments, the Portland cements that are suited for use in the disclosed CKD fluid include, but not limited to, Class A, C, G, H, low sulfate resistant cements, medium sulfate resistant cements, high sulfate resistant cements, or combinations thereof. The class A, C, G, H, are classified according to API Specification 10.

In embodiments, the cementitious material is present in the cementitious CKD fluid in an amount of from about 0.001 wt. % to about 99 wt. % based on the total solid weight of the cementitious CKD fluid, alternatively from about 0.01 wt. % to about 75 wt. %, alternatively from about 0.01 wt. % to about 50 wt. %, alternatively from about 15 wt. % to about 75 wt. %, alternatively from about 25 wt. % to about 60 wt. %, alternatively from about 25 wt. % to about 50 wt. %.

In some embodiments, the CKD fluid further comprises a supplementary cementitious material (SCM). Herein, an SCM refers to any inorganic material that is introduced to the fluid in order to increase the volume of the fluid (for example to lower the consumption of binder material such as Portland cement in a cementitious CKD fluid). In some embodiments, such SCMs may improve one or more properties of the fluid in which it is included. Examples of SCMs suitable for use in this disclosure include without limitation ASTM Class F fly ash, Class C fly ash, sand, shale, silica, zeolite, metakaolin, or combinations thereof.

In an embodiment, the SCM comprises ASTM Class F Fly ash. Class F fly ash comprises residues generated in the combustion of coal, typically produced from the burning of harder, older anthracite and bituminous coal. Typically, Class F fly ash contains less than about 10% lime. Unlike Class C fly ash, Class F fly ash does not react and harden with water by itself. In an embodiment, the SCM may be present in the CKD fluid, e.g., cementitious CKD fluid, in an amount of from about 0.001 wt. % to about 75 wt. % of total weight of the solid composition of the CKD fluid, alternatively from about 0.01 wt. % to about 50 wt. %, or alternatively from about 0.04 wt. % to about 25 wt. %.

In some embodiments, the CKD fluid further comprises one or more additives. In some embodiments, additives may be included in the CKD fluid for improving or changing the properties thereof. Examples of such additives include but are not limited to, a weight reducing additive, a heavyweight additive, a lost circulation material, a filtration control additive, a dispersant, a suspending agent, an expansion additive, an accelerator, a defoamer, a foaming surfactant, a fluid loss agent, a formation conditioning agent, hollow glass or ceramic beads, or combinations thereof. Other mechanical property modifying additives, for example, elastomers, carbon fibers, glass fibers, metal fibers, minerals fibers, and the like can be added to further modify the mechanical properties. These additives may be included singularly or in combination and in amounts effective to provide a user designated property of the CKD fluid.

In embodiments, the additive may be present in the CKD fluid in an amount of from about 0.001 wt. % to about 25 wt.

% of the total weight of the solid composition of the CKD fluid, alternatively from about 0.01 wt. % to about 10 wt. %, alternatively from about 0.04 wt. % to about 5 wt. %.

In embodiments, the CKD fluid, for example a spacer fluid, has a density in a range of from about 4 lb/gal to about 18 lb/gal, alternatively from about 7 lb/gal to about 16 lb/gal, alternatively from about 9 lb/gal to about 14 lb/gal. In embodiments, the CKD fluid, for example a cementitious CKD fluid, has a density in a range of from about 4 lb/gal to about 23 lb/gal, alternatively from about 12 lb/gal to about 17 lb/gal, alternatively from about 12 lb/gal to about 14 lb/gal.

In embodiments, the CKD fluids of the type disclosed herein are capable of remaining in a pumpable fluid state for equal to or greater than about 4, 6, 8, 10, 12, 14, 16, 18, 20, 22, or 24 hours.

In embodiments, the CKD fluid may have a yield point of from about 3 $lbf/100 ft^2$ to about 40 $lbf/100 ft^2$, alternatively from about 7 $lbf/100 ft^2$ to about 35 $lbf/100 ft^2$, alternatively from about 10 $lbf/100 ft^2$ to about 30 $lbf/100 ft^2$.

In some embodiments, the CKD fluid, for example a spacer fluid, as disclosed herein has a gelation rating of equal to or less than 3, where the scale is based upon the behavior of a glass rod that is placed into a homogeneous mixture of the CKD fluid (e.g., comprising CKD, the organic acid, and water) at 0 to 6 hours after the homogeneous mixture is made, wherein the weight ratio of the water to the CKD is in a range of from about 1.5 to about 2. The scale is: 1, rod falls down immediately due to no observed gelation; 2, rod falls down immediately but at a slower rate than in 1; 3, rod slowly falls down due to obvious gelation; 4, rod very hesitantly leans over or falls and leaves an engraved path due to above average gelation; and 5, rod is fully supported due to high gelation. In one example, if the rod falls down at a rate of 5 inch per second, the gelation rating is 1; if the rod falls down at a rate of 1 inch per second, the gelation rating is 2; if the rod falls down at a rate of 0.5 inch per second, the gelation rating is 3; if the rod falls down at a rate of 0.2 inch per second, the gelation rating is 4.

In some embodiments, the CKD fluid (e.g., a mixture of the CKD, the organic acid, and water) as disclosed herein has a rheological gel strength at room temperature as determined in accordance with API 10B-2 of less than or equal to 30 $lbf/100 ft^2$ for up to 5 hours after the CKD fluid is made (e.g., components thereof mixed together); wherein the weight ratio of the water to the CKD is from about 1:1 to about 2.5:1, and wherein the weight ratio of the organic acid to the CKD is in a range from about 0.04% to about 2%. Herein the rheological gel strength is the shear stress measured at low shear rate after a fluid has set at rest for a period of time (e.g., 10 second, 10 minute, 30 minutes).

In embodiments, the CKD fluid can be made by a method comprising: placing a mixture comprising CKD, an organic acid, and water into a container, and blending the mixture until the mixture becomes a homogeneous fluid. (e.g., a pumpable slurry). The container can be any container that is compatible with the mixture and has sufficient space for the mixture. A blender can be used for blending. In some embodiments, the CKD fluid can be prepared at the wellsite. For example the solid components of the CKD fluid can be transported to the wellsite and combined (e.g., mixed/blended) with water located proximate the wellsite to form the CKD fluid. In some embodiments, the solid composition of the CKD fluid can be prepared at a location remote from the wellsite and transported to the wellsite, and, if necessary, stored at the on-site location. When it is desirable to prepare the CKD fluid on the wellsite, the solid composition of the CKD fluid along with additional water and optional other additives can be added into a container (e.g. a blender tub, for example mounted on a trailer), and the mixture is then blended until the mixture becomes a homogeneous fluid (e.g., a pumpable slurry). In embodiments, additives may be added to the CKD fluid during preparation thereof (e.g., during blending) and/or on-the-fly by addition to (e.g., injection into) the CKD fluid when being pumped into the wellbore.

Disclosed herein is a method of servicing a wellbore penetrating a subterranean formation, comprising: placing a CKD fluid of the type described herein into the wellbore, wherein the CKD fluid comprises CKD, an organic acid, and water. It is to be understood that "subterranean formation" encompasses both areas below exposed earth and areas below earth covered by water such as ocean or fresh water. In embodiments, there can be a conduit (for example a work string, drill string, production tubing, coiled tubing, etc.) extending from the surface and located inside the wellbore forming an annular space between the exterior of the conduit and the wellbore wall, and the method as disclosed herein further comprises: circulating the CKD fluid from the surface down through the conduit, exiting the conduit and flowing the CKD fluid back to the surface via the annular space between the conduit wall and the wellbore wall. The circulation of the CKD fluid can be achieved by pumping. During circulation, the CKD fluid can carry and/or flush unwanted material (e.g., solids such as filter cake, particulate material, drill cuttings, etc. and/or liquids such as drilling or treatment fluids) inside the wellbore to the surface of the wellbore, thus the circulation can clean up the wellbore. In an embodiment, a relatively high volume of the CKD fluid may be circulated through the wellbore to clean and/or flush the wellbore of unwanted material.

In some embodiments, the CKD fluid is a spacer fluid, and a method of servicing a wellbore comprises placing (e.g., pumping) a first fluid into the wellbore, thereafter placing (e.g., pumping) the CKD spacer fluid into the wellbore, and thereafter placing (e.g., pumping) a second fluid into the wellbore, wherein the CKD spacer fluid physically spaces the first fluid apart from the second fluid such that the first fluid and the second fluid do not comingle while being placed (e.g., pumped) into the wellbore. For example, the spacer fluid can be used to space apart two fluids (e.g., drilling fluid/mud and a cementitious composition) that are being flowed from the surface down through a conduit (e.g., casing) present in the wellbore, exiting the conduit and flowing back upward in the annular space between the outside conduit wall and interior face of the wellbore.

Disclosed herein is a method of servicing a wellbore with casing disposed therein to form an annular space between the wellbore wall and the outer surface of the casing, wherein a drilling fluid (or other fluid) is present in at least a portion of the annular space. The drilling fluid herein refers to any liquid and gaseous fluid and mixtures of fluids and solids used in operations of drilling a borehole into the earth. The drilling fluid can be water based, non-water based, and/or gaseous. In embodiments, the method disclosed herein comprises: placing a CKD spacer into at least a portion of the annular space and displacing at least a portion of the drilling fluid from the annular space, wherein the CKD spacer comprises CKD, an organic acid, and water, and wherein the density and yield point of the CKD spacer are larger than the density and yield point of the drilling fluid. Herein the CKD spacer is a spacer fluid. A spacer fluid is used to physically separate one special purpose liquid from another, and a spacer fluid should be compatible with each of the special purpose fluids. In some embodiments, the method disclosed herein further comprises: placing a cementitious fluid into at least a portion of the annular space and displacing at least a portion of the CKD spacer from the annular space, wherein the density and yield point of the cementitious fluid are larger than the density and yield point of the CKD spacer. A cementitious fluid refers to the material used to permanently seal the annular space between the casing and the wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is less viscous and has less strength than cement or concrete used for construction, since the cementitious fluid is required to be pumpable in relatively narrow annulus over long distances. A cementitious fluid is typically prepared by mixing cement, water, and assorted dry and liquid additives. In embodiments, the CKD spacer (e.g., comprising CKD, an organic acid, and water) is used to separate the drilling fluid from the cementitious fluid.

In embodiments, disclosed herein is a method of servicing a wellbore with casing disposed therein to form an annular space between the wellbore wall and the outer surface of the casing, wherein a drilling fluid (or other fluid) is present in at least a portion of the annular space. In embodiments, the method disclosed herein comprises: placing a spacer fluid into at least a portion of the annular space and displacing at least a portion of the drilling fluid from the annular space, wherein the density and yield point of the spacer fluid are larger than the density and yield point of the drilling fluid. In some embodiments, the method disclosed herein further comprises: placing a CKD cementitious fluid into at least a portion of the annular space and displacing at least a portion of the spacer fluid from the annular space, wherein the density and yield point of the CKD cement fluid are larger than the density and yield point of the spacer fluid. Herein the CKD cementitious fluid comprises CKD, an organic acid, cementitious material, and water.

In embodiments, disclosed herein is a method of servicing a wellbore with casing disposed therein to form an annular space between the wellbore wall and the outer surface of the casing, wherein a drilling fluid (or other fluid) is present in at least a portion of the annular space. In embodiments, the method disclosed herein comprises: placing a CKD spacer into at least a portion of the annular space and displacing at least a portion of the drilling fluid from the annular space, wherein the density and yield point of the CKD spacer are larger than the density and yield point of the drilling fluid. Herein the CKD spacer comprises CKD, an organic acid, and water. In some embodiments, the method disclosed herein further comprises: placing a CKD cementitious fluid into at least a portion of the annular space and displacing at least a portion of the CKD spacer from the annular space, wherein the density and yield point of the CKD cementitious fluid are larger than the density and yield point of the CKD spacer. Herein the CKD cementitious fluid comprises CKD, an organic acid, cementitious material, and water.

In embodiments, the method disclosed herein further comprises placing a CKD fluid into at least a portion of the tubular space inside the casing; and displacing at least a portion of the cementitious fluid or CKD cementitious fluid from the tubular space. For example, a CKD fluid of the type described herein can be pumped into the wellbore following release of a cement plug, and the CKD fluid can be used to push the cement plug through the casing, which in turn pushes the cementitious fluid (e.g., CKD cementitious fluid) out of the casing and into the annular space between the casing and the wellbore wall.

In some embodiments, the methods disclosed herein further comprise allowing the spacer fluid (e.g., the CKD spacer) to gel and/or set. In some embodiments, the methods disclosed herein further comprise allowing the cementitious fluid (e.g., the CKD cementitious fluid) to set.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

The following examples show the mitigation of CKD fluid gelation through the use of organic acids. Two CKDs from different vendors and with differing physicochemical properties (Table 1) were selected to be tested. Several retarder types and loadings were mixed with these CKDs to determine their effectiveness for gel mitigation of CKD fluids of the type disclosed herein.

TABLE 1

Physicochemical characteristics of CKDs

|  | SG | BD | WR | $SiO_2$ | CaO |
|---|---|---|---|---|---|
| Lafarge CKD (Midlothian, TX) | 2.99 | 63.2 | 91 | 21.4 | 65.2 |
| Holcim CKD (Ada, OK) | 2.85 | 42.7 | 83 | 30.2 | 53.3 |

Example 1

A commonly used CKD from Lafarge's Midlothian, Tex. facility was chosen to determine the effectiveness of several types of retarders on slowing down gelation behavior of the CKD fluid of the type disclosed herein.

The CKD was dry blended with either no retarder as a control, high concentration of retarder (2% by weight of the CKD) or low concentration of retarder (0.4% by weight of the CKD). The formulations are summarized in Table 2 below.

TABLE 2

Formulations of Lafarge CKD slurries including different retarder concentrations

| Material Name | Control | High Concentration | Low Concentration |
|---|---|---|---|
| CKD (g) | 200 | 200 | 200 |
| Water (g) | 400 | 400 | 400 |
| Retarder Concentration (g) | 0 | 4.0 | 0.8 |

The dry blend was added to the water and this mixture was hand mixed with a glass rod until homogeneity was achieved. The slurry was then poured into a 200 mL Tri-Pour® beaker and rheological observations were made and recorded using the observational scale below.

Observational Scale:

The scale is based upon the behavior of a glass rod that has been placed into the slurry:

1—rod falls down immediately due to no observed gelation; 2—rod falls down immediately but at a slower rate than in 1; 3—rod slowly falls down due to obvious gelation; 4—rod very hesitantly leans over or falls and leaves an engraved path due to above average gelation; and 5—rod is fully supported due to high gelation.

Table 3 below summarizes the results of this testing. It appears that at the low concentration, no significant reduction in gelation occurs for any of the retarder types.

TABLE 3

Tabulated observations of Lafarge CKD gelation behavior with various retarders

| Time (min) | Control | Maltodextrin Low Conc. | Maltodextrin High Conc. | Lignosulfonate Low Conc. | Lignosulfonate High Conc. | AMPS co-polymer Low Conc. | AMPS co-polymer High Conc. | Tartaric Acid Low Conc. | Tartaric Acid High Conc. | Citric Acid Low Conc. | Citric Acid High Conc. | ATMP* Low Conc. | ATMP* High Conc. |
|---|---|---|---|---|---|---|---|---|---|---|---|---|---|
| 0 | 1 | 1 | 1 | 1 | 1 | 1 | 1 | 1 | 1 | 1 | 1 | 1 | 1 |
| 150 | 2 | 2 | 3 | 3 | 4 | 3.5 | 4 | 4 | 1.5 | 2.5 | 1.5 | 2.5 | 1.5 |
| 300 | 2.5 | 3.5 | 4 | 3.8 | 4 | 3.8 | 4 | 4 | 1 | 3.8 | 1 | 3.5 | 1 |
| 360 | 3 | 3 | 3 | 3.8 | 4 | 3.8 | 4 | 4 | 1 | 3.8 | 1 | 3.5 | 1 |

*aminotrismethylenephosphonic acid

AMPS is a copolymer of 2-acrylamido-2methyl propane sulfonate and acrylamide.

However, as seen in FIG. 1, at higher retarder loading, the organic acids (e.g., tartaric acid, citric acid, and ATMP) prevent gelation of the CKD fluid not only initially (time=0) but over extended periods of time (up to 6 hours).

Conversely, as seen in FIG. 1, other retarder types such as maltodextrin (sugar type retarders), lignosulfonate, and synthetic retarders (AMPS) actually increase the amount of gelation relative to the control.

Example 2

As verification that this phenomenon holds true for various CKD sources, a second experiment was performed with a CKD sourced from Holcim's Ada, Okla. facility. Although the water content of the slurries was adjusted slightly, the same formulations and procedures as in Example 1 were repeated. The formulations are shown in Table 4 below.

TABLE 4

Formulations of Holcim CKD slurries including different retarder concentrations

| Material Name | Control | High Concentration | Low Concentration |
|---|---|---|---|
| CKD (g) | 200 | 200 | 200 |
| Water (g) | 312 | 312 | 312 |
| Retarder Concentration (g) | 0 | 4.0 | 0.8 |

The same observational scale was used to rate the effectiveness of the retarders in gelation pacification. Table 5 below summarizes the results of this testing.

Similar to the CKD fluids comprising the Lafarge Midlothian, Tex. CKD, low retarder concentrations have minimal effect on the gelation behavior of CKD fluids comprising the Holcim Ada, Okla. CKD.

Figure 2:
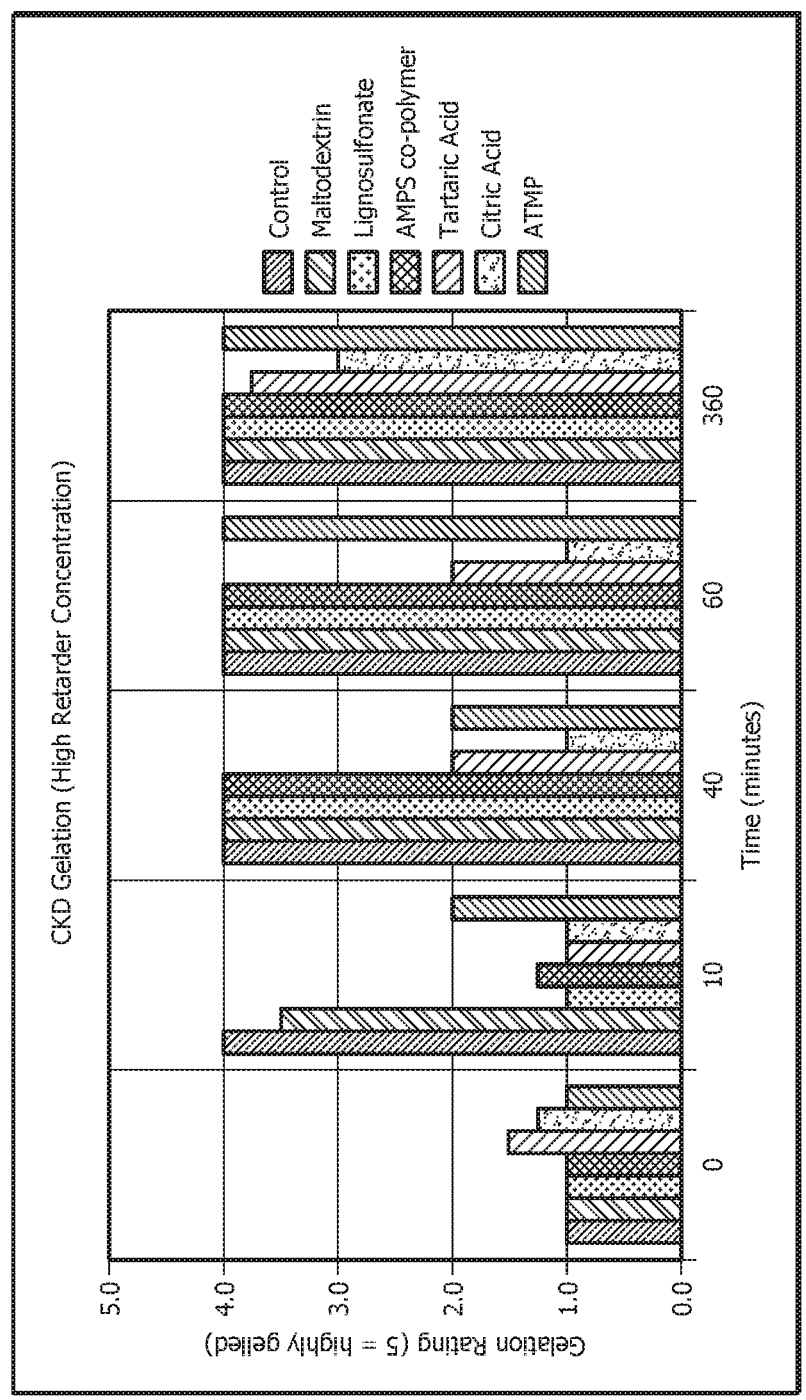
FIG. 2 shows the comparison of Holcim CKD gelation with high retarder concentrations.

For high concentration of retarder, as detailed in FIG. 2, citric acid was the most effective gel mitigator, outperforming the control at all time intervals. Tartaric acid and ATMP also performed well until about 60 minutes after which time the gelation increased back to control levels. This time dependence of performance indicates that most likely higher concentrations of Tartaric and ATMP are required to prevent gelation over long time frames. Again, the other retarder types seemed to enhance gelation of the CKD.

As can be seen from the results of both Examples 1 and 2, the organic acid retarder types mitigated CKD gelation much more effectively than the other types.

Example 3

To obtain a more quantitative result, rheological gel strength testing was performed on the same CKD fluid as Example 2 (e.g., comprising Holcim Ada, Okla. CKD) with varying amounts of retarder. The same control and 2% retarder concentration formulations were tested. The blends were mixed together with water in a waring blender for 35 seconds at 4000 RPM and gel strength was performed on a FANN 35 viscometer. The 10 second and 30 minute gel strengths were recorded at room temperature in accordance with the procedure set forth in API 10B-2.

TABLE 5

Tabulated observations of Holcim CKD gelation behavior with various retarders

| Time (min) | Control | Maltodextrin Low Conc. | Maltodextrin High Conc. | Lignosulfonate Low Conc. | Lignosulfonate High Conc. | AMPS co-polymer Low Conc. | AMPS co-polymer High Conc. | Tartaric Acid Low Conc. | Tartaric Acid High Conc. | Citric Acid Low Conc. | Citric Acid High Conc. | ATMP Low Conc. | ATMP High Conc. |
|---|---|---|---|---|---|---|---|---|---|---|---|---|---|
| 0 | 1 | 1 | 1 | 1 | 1 | 1 | 1 | 1 | 1.5 | 1 | 1.25 | 1 | 1 |
| 10 | 4 | 4 | 3.5 | 4 | 1 | 4 | 1.25 | 1 | 1 | 1 | 1 | 4 | 2 |
| 40 | 4 | 4 | 4 | 4 | 4 | 4 | 4 | 2 | 2 | 1 | 4 | 2 |
| 60 | 4 | 4 | 4 | 4 | 4 | 4 | 4 | 2 | 4 | 1 | 4 | 4 |
| 360 | 4 | 4 | 4 | 4 | 4 | 4 | 4 | 3.75 | 4 | 3 | 4 | 4 |

TABLE 6

Gel strength measurements of various retarders

| Concentration | Retarder Type | 10 second max. dial reading | 30 minute max. dial reading |
|---|---|---|---|
| 0% | None | 6 | >300 |
| 2% | Lignosulfonate | 3 | >300 |
| 2% | Citric Acid | 7 | 7 |

As can be seen in Table 6, there is a definitive difference in the 30 minute gel strength of the control and the slurries with citric acid. The citric acid, at 2% loading, provided gel mitigation throughout the duration of the test. While the lignosulfonate may have provided some initial dispersion, after 30 minutes the gel strength was no different than the control.

To further expand on the results from Table 6, the slurry with 2% citric acid was run again, this time for a 5 and 8 hour gel times. The results are shown below as an addition to the previous data.

TABLE 7

Gel Strength measurements for 2% citric acid treatment

| 10 second max. dial reading | 5 hour max. dial reading | 8 hour max. dial reading |
|---|---|---|
| 7 | 15 | 71 |

The results from Table 7 show how the citric acid treatment inhibits gelation for a finite amount of time. Therefore, with the addition of citric acid, CKD fluids (e.g., slurries) can be tuned to stave of gelation for a limited amount of time before building gel strength. This is relevant for fluid (e.g., slurry) placement during field operations and allows for a range of tunable solutions for customers.

Example 4

A CKD slurry with tartaric acid as the retarder was prepared, using the same formulation of the high concentration retarder dosage in Table 4. The CKD slurry was mixed in a waring blender according to API 10B-2. It was then conditioned at 140° F. in an atmospheric consistometer for 2 hours to simulate placement during field operations. The rheologies were then recorded as in Table 8.

TABLE 8

Rheologies of CKD slurries with high concentration tartaric acid

| RPM | Dial Reading |
|---|---|
| 3 | 13 |
| 6 | 16 |
| 30 | 50 |
| 60 | 60 |
| 100 | 66 |
| 200 | 77 |
| 300 | 85 |

Performed using a FANN 35 Viscometer with R1B1F1 configuration as in Example 3.

The rheology results above show that the CKD slurry is viable in field operations. For example, in use conditions from a typical West Texas well, pumping 50 bbl of spacer with this rheological profile in a 5.5 inch OD and 4.779 inch ID casing, the pressure drop in the casing is 66 psi and in the open hole-casing annulus the pressure drop is 129 psi. These low pressure values show that the CKD mitigation slurry can easily be pumped in field operations.

Example 5

Figure 3:
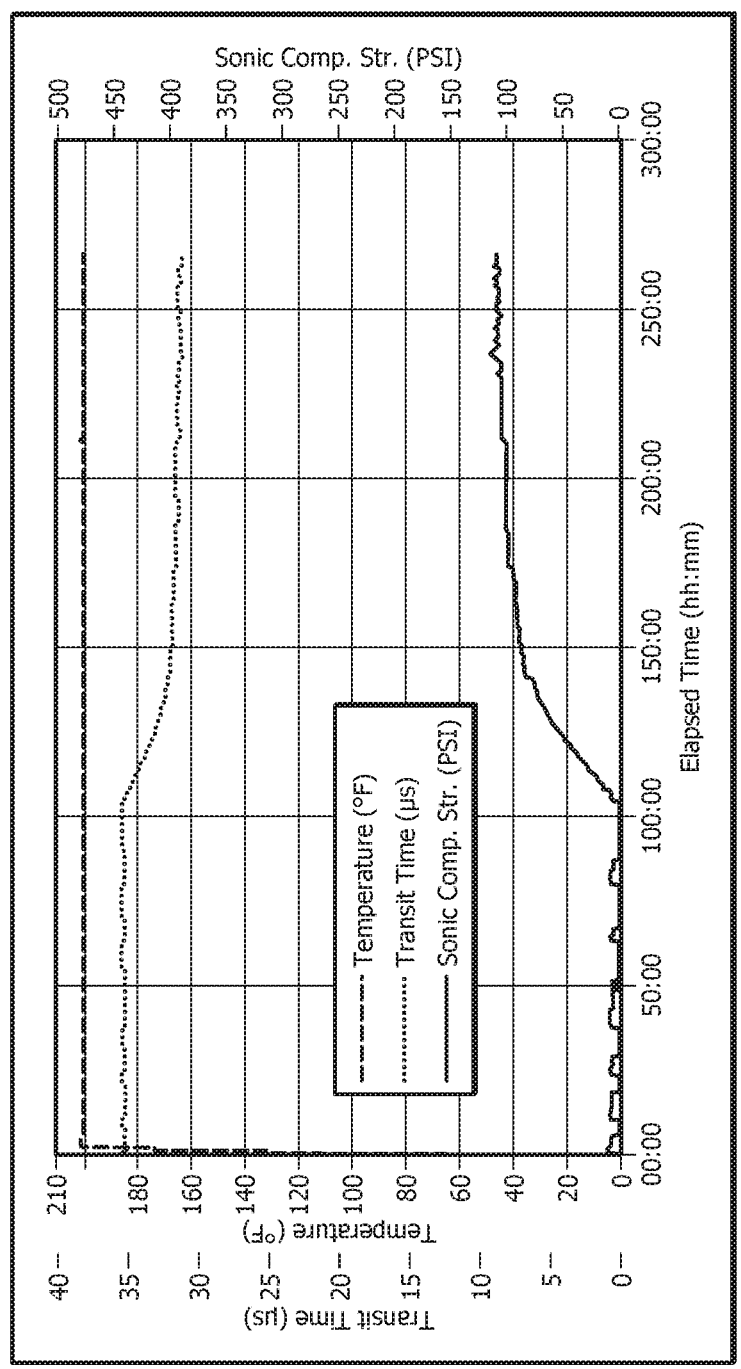
FIG. 3 shows the ultrasonic cement analyzer (UCA) chart of a CKD slurry with a high concentration of tartaric acid.

The same CKD slurry as in EXAMPLE 4 was prepared and put directly into an ultrasonic cement analyzer (UCA) to determine degree of consolidation. The test parameters consisted of a temperature ramp to 200° F. in 2 hours and a constant pressure of 3000 psi. As can be seen in the UCA chart in FIG. 3, even though the slurry had a high concentration of tartaric acid, it eventually consolidates into a hardened mass with an ultrasonic compressive strength of 100 psi in approximately 7 days.

ADDITIONAL DISCLOSURE

The following are non-limiting, specific embodiments in accordance with the present disclosure:

A first aspect, which is a wellbore servicing composition comprising: cement kiln dust (CKD), an organic acid, and water.

A second aspect, which is the wellbore servicing composition of the first aspect, wherein the CKD contains analytical CaO in an amount of from about 30 wt. % to about 90 wt. % by weight of the CKD, analytical $SiO_2$ in an amount of from about 0 wt. % to about 30 wt. % by weight of the CKD, analytical $Al_2O_3$ in an amount of from about 0 wt. % to about 12 wt. % by weight of the CKD.

A third aspect, which is the wellbore servicing composition of the first or the second aspect, wherein the CKD has a specific gravity (SG) of from about 2.6 to about 3.2.

A fourth aspect, which is the wellbore servicing composition of any of the first to the third aspects, wherein the CKD has an average SG of about 2.8.

A fifth aspect, which is the wellbore servicing composition of any of the first to the fourth aspects, wherein the CKD has a bulk density (BD) of from about 33 $lb/ft^3$ to about 84 $lb/ft^3$.

A sixth aspect, which is the wellbore servicing composition of any of the first to the fifth aspects, wherein the CKD has an average BD of about 50 $lb/ft^3$.

A seventh aspect, which is the wellbore servicing composition of any of the first to the sixth aspects, wherein the CKD has a water requirement (WR) of from about 21 wt. % to about 100 wt. %.

An eighth aspect, which is the wellbore servicing composition of any of the first to the seventh aspects, wherein the CKD has an average WR of about 65 wt. %.

A ninth aspect, which is the wellbore servicing composition of any of the first to the eighth aspects, wherein the CKD is present in an amount of from about 0.001 wt. % to about 99 wt. % based on the total solid weight of the wellbore servicing composition.

A tenth aspect, which is the wellbore servicing composition of any of the first to the ninth aspects, wherein the organic acid comprises tartaric acid, citric acid, oxalic acid, gluconic acid, oleic acid, uric acid, maleic acid, fumaric acid, acetic acid, octenyl succinic acid, dodecenyl succinic acid, aminotrismethylenephosphonic acid (ATMP), lactic acid, formic acid, oxalic acid, glyoxylic acid, glycolic acid, uric acid, amino acid, propionic acid, butyric acid, phthalic acid, malonic acid, oxaloacetic acid, benzoic acid, glucuronic acids, acrylic acid, malonic acid, tartronic acid, mesoxalic acid, dihydroxymalonic acid, pyruvic acid, hydracrylic acid, glyceric acid, glycidic acid, isobutyric acid, acetoacetic acid, malic acid, crotonic acid, valeric acid, iso-valeric acid, glutaric acid, oxoglutaric acid, caproic acid, adipic acid, pyrocitric acid, isocitric acid, sorbic acid, enanthic acid, pimelic acid, salicylic acid, cinnamic acid, caprylic acid, phthalic acid, pelargonic acid, trimesic acid, carpric acid, sebacic acid, or combinations thereof.

An eleventh aspect, which is the wellbore servicing composition of any of the first to the tenth aspects, wherein the organic acid comprise tartaric acid, citric acid, aminotrismethylenephosphonic acid (ATMP), or combinations thereof.

A twelfth aspect, which is the wellbore servicing composition of any of the first to the eleventh aspects, wherein the organic acid may be used at bottomhole circulating temperatures (BHCTs) in the range of from about 50° F. to about 500° F.

A thirteenth aspect, which is the wellbore servicing composition of any of the first to the twelfth aspects, wherein the organic acid is present in an amount of from about 0.01 wt. % to about 10 wt. % based on the total solid weight of the wellbore servicing composition.

A fourteenth aspect, which is the wellbore servicing composition of any of the first to the thirteenth aspects, wherein the ratio of the weight of the organic acid to CKD is in a range of from about 0.5% to about 4%.

A fifteenth aspect, which is the wellbore servicing composition of any of the first to the fourteenth aspects, wherein the water comprises water selected from the group consisting of freshwater, saltwater, brine, seawater, and any combination thereof.

A sixteenth aspect, which is the wellbore servicing composition of any of the first to the fifteenth aspects, wherein the ratio of the weight of the water to the solid compositions in the wellbore servicing composition is in a range from about 0.5:1 to about 7:1.

A seventeenth aspect, which is the wellbore servicing composition of any of the first to the sixteenth aspects, further comprising a cementitious material.

An eighteenth aspect, which is the wellbore servicing composition of the seventeenth aspect, wherein the cementitious material comprises Portland cement, pozzolana cement, gypsum cement, shale cement, acid/base cement, phosphate cement, high alumina content cement, slag cement, silica cement, high alkalinity cement, magnesia cement, or combinations thereof.

A nineteenth aspect, which is the wellbore servicing composition of any of the seventeenth to the eighteenth aspects, wherein the cementitious material is present in an amount of from about 0.001 wt. % to about 99 wt. % based on the total solid weight of the wellbore servicing composition.

A twentieth aspect, which is the wellbore servicing composition of any of the first to the nineteenth aspects, further comprising a supplementary cementitious material (SCM).

A twenty-first aspect, which is the wellbore servicing composition of the twentieth aspect, wherein the SCM comprises Class F fly ash, Class C fly ash, sand, shale, silica, zeolite, metakaolin, or combinations thereof.

A twenty-second aspect, which is the wellbore servicing composition of any of the twentieth to the twenty-first aspects, wherein the SCM is present in an amount of from about 0.001 wt. % to about 75 wt. % of total weight of the solid composition of the wellbore servicing composition.

A twenty-third aspect, which is the wellbore servicing composition of any of the first to the twenty-second aspects, further comprising an additive selected from the group consisting of a weight reducing additive, a heavyweight additive, a lost circulation material, a filtration control additive, a dispersant, a suspending agent, an expansion additive, an accelerator, a defoamer, a foaming surfactant, a fluid loss agent, latex emulsions, a formation conditioning agent, hollow glass or ceramic beads, elastomers, carbon fibers, glass fibers, metal fibers, minerals fibers, and any combination thereof.

A twenty-fourth aspect, which is the wellbore servicing composition of the twenty-third aspect, wherein the additive is present in an amount of from about 0.001 wt. % to about 25 wt. % of the solid composition of the wellbore servicing composition.

A twenty-fifth aspect, which is the wellbore servicing composition of any of the first to the twenty-fourth aspects has a density in a range of from about 4 lb/gal to about 23 lb/gal.

A twenty-sixth aspect, which is the wellbore servicing composition of any of the first to the twenty-fifth aspects is capable of remaining in a pumpable fluid state for at least about 4 hours.

A twenty-seventh aspect, which is the wellbore servicing composition of any of the first to the twenty-sixth aspects has a gelation rating of equal to or less than 3, where the scale has a value of 1 to 5 based upon the behavior of a glass rod that is placed into a homogeneous mixture of the CKD, the organic acid, and water at 0 to 6 hours after the homogeneous mixture is made, wherein the weight ratio of the water to the CKD is in a range of from about 1.5 to about 2, and wherein the weight ration of the organic acid to the CKD is in a range from about 0.04% to about 2% and wherein the value of 1 to 5 is determined via visual observation as follows:

1, rod falls down immediately due to no observed gelation;
2, rod falls down immediately but at a slower rate than in 1;
3, rod slowly falls down due to obvious gelation;
4, rod very hesitantly leans over or falls and leaves an engraved path due to above average gelation; and
5, rod is fully supported due to high gelation.

A twenty-eighth aspect, which is the wellbore servicing composition of any of the first to the twenty-seven aspects. wherein the rheological gel strengths at room temperature as in API 10B-2 of a mixture of the CKD, the organic acid, and water is less than or equal to 30 lbf/100 ft$^2$ for up to 5 hours after the mixture is made; wherein the weight ratio of the water to the CKD is from about 1:1 to about 2.5:1, and wherein the weight ratio of the organic acid to the CKD is in a range from about 0.04% to about 2%.

A twenty-ninth aspect, which is a method of making a wellbore servicing composition, comprising: placing a mixture comprising CKD, an organic acid, water, and optionally a cementitious material into a container; and blending the mixture until the mixture becomes a homogeneous fluid.

A thirtieth aspect, which is a method of servicing a wellbore penetrating a subterranean formation, comprising: placing a wellbore servicing composition into the wellbore, wherein the wellbore servicing composition comprises CKD, an organic acid, and water.

A thirty-first aspect, which is the method of the thirtieth aspect, wherein the wellbore comprising a conduit disposed therein, wherein the conduit is cylindrical having an inner bore and an outer wall and wherein the method further comprises: circulating the wellbore servicing composition downward through the inner bore and upward through an annular space between the outer wall of the conduit and a wall of the wellbore.

A thirty-second aspect, which is the method of any of the thirtieth to the thirty-first aspects, wherein the wellbore servicing composition removes material from the wellbore, thereby cleaning the wellbore.

A thirty-third aspect, which is a method of servicing a wellbore with casing disposed therein to form annular space between a wellbore wall and an outer surface of the casing, wherein a first fluid is present in at least a portion of the annular space, comprising placing a second fluid into at least a portion of the annular space and displacing at least a portion of the first fluid from the annular space, wherein the density and yield point of the second fluid are larger than the density and yield point of the first fluid, and placing a third fluid into at least a portion of the annular space and displacing at least a portion of the second fluid from the annular space, wherein the density and yield point of the third fluid are larger than the density and yield point of the second fluid; wherein the second fluid, the third fluid, or both of the second fluid and the third fluid comprise cement kiln dust (CKD), an organic acid, and water.

A thirty-fourth aspect, which is the method of the thirty-third aspect, wherein the first fluid is a drilling fluid.

A thirty-fifth aspect, which is the method of the thirty-third or the thirty-fourth aspect, wherein the second fluid is a spacer fluid.

A thirty-sixth aspect, which is the method of the thirty-third, the thirty-fourth, or the thirty-fifth aspect, wherein the third fluid is a cementitious fluid.

A thirty-seventh aspect, which is the method of any of the thirty-third to the thirty-sixth aspects wherein the second and third fluids are pumped from the surface downward through an inner bore of the casing, exiting a bottom of the casing, and flowing upward through the annular space.

A thirty-eighth aspect, which is the method of the thirty-seventh aspect, further comprising placing a fourth fluid into at least a portion of the inner bore of the casing; and displacing at least a portion of the third fluid from the inner bore of the casing, wherein the fourth fluid comprises CKD, and organic acid, and water.

A thirty-ninth aspect, which is the method of any of the thirty-third to the thirty-eighth aspects, further comprising allowing at least a portion of the second fluid to gel or set.

A fortieth aspect, which is the method of any of the thirty-third to the thirty-ninth aspects, further comprising allowing at least a portion of the third fluid to set.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k* (Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore penetrating a subterranean formation, wherein the wellbore comprises a casing disposed therein to form annular space between a wellbore wall and an outer surface of the casing and wherein a drilling fluid is present in at least a portion of the annular space, the method comprising: placing a spacer fluid into at least a portion of the annular space and displacing at least a portion of the drilling fluid from the annular space, wherein the density and yield point of the spacer fluid are larger than the density and yield point of the drilling fluid, and wherein the spacer fluid comprises cement kiln dust (CKD), an organic acid, and water.

2. The method of claim 1, wherein the CKD has a specific gravity (SG) of from about 2.6 to about 3.2.

3. The method of claim 1, wherein the CKD has a bulk density (BD) of from about 33 lb/ft$^3$ to about 84 lb/ft$^3$.

4. The method of claim 1, wherein the CKD has a water requirement (WR) of from about 21 wt. % to about 100 wt. %.

5. The method of claim 1, wherein the organic acid comprises tartaric acid, citric acid, oxalic acid, gluconic acid, oleic acid, uric acid, maleic acid, fumaric acid, acetic acid, octenyl succinic acid, dodecenyl succinic acid, aminotrismethylenephosphonic acid (ATMP), lactic acid, formic acid, oxalic acid, glyoxylic acid, glycolic acid, uric acid, amino acid, propionic acid, butyric acid, phthalic acid, malonic acid, oxaloacetic acid, benzoic acid, glucuronic acids, acrylic acid, malonic acid, tartronic acid, mesoxalic acid, dihydroxymalonic acid, pyruvic acid, hydracrylic acid, glyceric acid, glycidic acid, isobutyric acid, acetoacetic acid, malic acid, crotonic acid, valeric acid, iso-valeric acid, glutaric acid, oxoglutaric acid, caproic acid, adipic acid, pyrocitric acid, isocitric acid, sorbic acid, enanthic acid, pimelic acid, salicylic acid, cinnamic acid, caprylic acid, phthalic acid, pelargonic acid, trimesic acid, carpric acid, sebacic acid, or combinations thereof.

6. The method of claim 1, wherein the organic acid may be used at bottomhole circulating temperatures (BHCTs) in a range of from about 50° F. to about 500° F.

7. The method of claim 1, wherein the organic acid is present in an amount of from about 0.01 wt. % to about 10 wt. % based on a total solid weight of the spacer fluid.

8. The method of claim 1, wherein a ratio of a weight of the organic acid to CKD is in a range of from about 0.5% to about 4%.

9. The method of claim 1, wherein the spacer fluid has a density in a range of from about 4 lb/gal to about 23 lb/gal.

10. The method of claim 1 wherein the spacer fluid is capable of remaining in a pumpable fluid state for at least about 4 hours.

11. The method of servicing a wellbore of claim 1, further comprising placing a cementitious fluid into at least a portion of the annular space and displacing at least a portion of the spacer fluid from the annular space, wherein the density and yield point of the cementitious fluid are larger than the density and yield point of the spacer fluid.

12. The method of claim 11, wherein the organic acid comprise tartaric acid, citric acid, aminotrismethylenephosphonic acid (ATMP), or combinations thereof.

13. The method of claim 1, wherein the organic acid comprise tartaric acid, citric acid, aminotrismethylenephosphonic acid (ATMP), or combinations thereof.

14. The method of claim 13, wherein the CKD has a specific gravity (SG) of from about 2.6 to about 3.2, wherein the CKD has a bulk density (BD) of from about 33 lb/ft$^3$ to about 84 lb/ft$^3$, and wherein the CKD has a water requirement (WR) of from about 21 wt. % to about 100 wt. %.

15. The method of claim 14, wherein the organic acid is present in an amount of from about 0.01 wt. % to about 10 wt. % based on a total solid weight of the spacer fluid.

16. The method of claim 15, wherein the organic acid may be used at bottomhole circulating temperatures (BHCTs) in a range of from about 50° F. to about 500° F.

17. The method of claim 11, wherein the cementitious fluid comprises a cementitious material, CKD, an organic acid, and water.

18. The method of claim 17, wherein the cementitious material comprises Portland cement, pozzolana cement, gypsum cement, shale cement, acid/base cement, phosphate cement, high alumina content cement, slag cement, silica cement, high alkalinity cement, magnesia cement, or combinations thereof.

19. The method of claim 17, further comprising a supplementary cementitious material (SCM).

20. The method of claim 19, wherein the SCM comprises Class F fly ash, Class C fly ash, sand, shale, silica, zeolite, metakaolin, or combinations thereof.

* * * * *